US006329054B1

(12) United States Patent
Rogestedt et al.

(10) Patent No.: US 6,329,054 B1
(45) Date of Patent: *Dec. 11, 2001

(54) CABLE AND METHOD FOR USING A CABLE-SHEATHING COMPOSITION INCLUDING AN ETHYLENE POLYMER MIXTURE

(75) Inventors: Laila Rogestedt, Ödsmål; Hans-Bertil Martinsson, Varekil, both of (SE); Markku Asumalahti, Kerava; Jari Äärilä, Porvoo, both of (FI)

(73) Assignee: Borealis Polymers Oy, Porvoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/983,273

(22) PCT Filed: Jul. 3, 1996

(86) PCT No.: PCT/SE96/00900

§ 371 Date: May 15, 1998

§ 102(e) Date: May 15, 1998

(87) PCT Pub. No.: WO97/03124

PCT Pub. Date: Jan. 30, 1997

(30) Foreign Application Priority Data

Jul. 10, 1995 (SE) ................................ 9502508

(51) Int. Cl.[7] .................. C08L 23/04; H01B 9/00; H01B 11/00

(52) U.S. Cl. ............... 428/378; 428/379; 428/375; 428/383; 174/110 PM; 174/110 R; 174/110 SR; 174/120 R; 385/100; 385/106; 525/240

(58) Field of Search .................. 525/240; 428/383, 428/378, 379, 375; 174/110 PM, 120 R, 110 SR, 110 R; 385/100, 106

(56) References Cited

U.S. PATENT DOCUMENTS

| 3,646,155 | 2/1972 | Scott . |
|---|---|---|
| 3,749,629 | 7/1973 | Andrews et al. . |
| 4,117,195 | 9/1978 | Swarbrick et al. . |
| 4,286,023 | 8/1981 | Ongchin . |
| 4,297,310 | 10/1981 | Akutsu et al. . |

(List continued on next page.)

FOREIGN PATENT DOCUMENTS

| 0 040 992 | 5/1984 | (EP) . |
|---|---|---|
| 0 041 796 | 8/1984 | (EP) . |
| 0 207 627 A2 | 1/1987 | (EP) . |
| 0 207 627 A3 | 1/1987 | (EP) . |
| 0 022 376 | 3/1987 | (EP) . |

(List continued on next page.)

OTHER PUBLICATIONS

JP 2–235740 abstract. Jujo Paper Co Ltd, Sep. 18, 1990, abstract, figure 1. Japan, vol. 14, No. 552, M–1056.
JP 06340036 A abstract. Goyo PaperWorking Co Ltd, Dec. 13, 1994. Japan, vol. 94, No. 12.
JP 01100803 A2 abstract. STN International, File Caplus, Caplus accession No. 1989:555983, Doc. No. 111:155983, Hitachi Cable, Ltd.: "Hindered amine–containing crosslinked polyethylene electric insulators for cables and wires": Apr. 19, 1989.
JP 56065667 A abstract. Jun. 3, 1981. Derwent Info Ltd.
WPI, Derwent Accession No. 90–326069, Jujo Paper MFG KK: "Blank for Paper container for food packaging—comprises paper board, thermoplastic layer laminated for outside of container and two resin layers contain deodorise;" & JP A 2235740, 900918.+.
WPI Derwent accession No. 77–85827Y, Sumitomo Chem Co. Ltd: "Straight chain ethylene copolymers preparation copolymerise ethylene, glycol mono–acrylate and ethylenically unsaturated monomer," JP A 52126495, 441024, DW7748.
International Search Report for PCT/SE94/00773 dated Mar. 14, 1995.
International Search Report for PCT/SE94/01028 dated Mar. 14, 1995.
International Search Report for PCT/SE96/00900 dated Oct. 14, 1996.
International Search Report for PCT/SE97/01197 dated Oct. 28, 1997.
International Search Report for PCT/SE98/00013 dated May 5, 1998.

(List continued on next page.)

Primary Examiner—Donald R. Wilson
(74) Attorney, Agent, or Firm—Merchant & Gould P.C.

(57) ABSTRACT

A cable-sheating composition and its use as outer sheath for a power cable or a communication cable are disclosed. The cable-sheating composition is a multimodal, preferably bimodal, mixture of olefin polymers, preferable ethylene plastics, having a density of about 0.915–0.955 g/cm$^3$ and a melt flow rate of about 0.1–0.3 g/10 min, said olefin polymer mixture comprising at least a first and a second olefin polymer, of which the first has a density and a melt flow rate selected from (a) about 0.930–0.975 g/cm$^3$ and about 50–2000 g/10 min and (b) about 0.88–0.93 g/cm$^3$ and about 0.1–0.8 g/10 min. Preferably, the olefin polymer mixture has been obtained by coordination-catalyzed polymerization of at least one α-olefin in several stages, preferably two stages consisting of a loop reactor/a gas-phase reactor or a gas-phase reactor/a gas-phase reactor, through polymerization or copolymerization of ethylene in the first stage and copolymerization of ethylene with butene, 4-methyl-1-pentene, 1-hexene or 1-octene in the second stage.

26 Claims, No Drawings

U.S. PATENT DOCUMENTS

| | | |
|---|---|---|
| 4,351,876 | 9/1982 | Doi et al. . |
| 4,397,981 | 8/1983 | Doi et al. . |
| 4,413,066 | 11/1983 | Isaka et al. . |
| 4,446,283 | 5/1984 | Doi et al. . |
| 4,456,704 | 6/1984 | Fukumara et al. . |
| 4,576,993 | 3/1986 | Tamplin et al. . |
| 4,795,482 | 1/1989 | Gioffre et al. . |
| 4,812,505 | 3/1989 | Topcik . |
| 4,970,278 | 11/1990 | Komabashiri et al. . |
| 5,047,468 * | 9/1991 | Lee et al. ............... 525/240 |
| 5,149,738 * | 9/1992 | Lee et al. ............... 525/240 |
| 5,380,803 * | 1/1995 | Coutant et al. ............ 525/240 |
| 5,382,631 * | 1/1995 | Stehling et al. ........... 525/240 |
| 5,453,322 | 9/1995 | Keogh et al. . |
| 5,521,264 * | 5/1996 | Mehra et al. ............. 526/68 |
| 5,574,816 | 11/1996 | Yang et al. . |
| 5,580,493 | 12/1996 | Chu et al. . |
| 5,582,923 * | 12/1996 | Kale et al. ............. 428/523 |
| 5,718,974 | 2/1998 | Kmiec . |
| 5,719,218 | 2/1998 | Sarma . |
| 5,731,082 * | 3/1998 | Gross et al. ............ 428/379 |
| 5,736,258 | 4/1998 | Moy . |
| 5,798,427 * | 8/1998 | Foster et al. ............ 526/352 |
| 5,807,635 | 9/1998 | Cogen et al. . |
| 5,891,979 | 4/1999 | Dammert et al. . |

FOREIGN PATENT DOCUMENTS

| | | |
|---|---|---|
| 0237294 | 9/1987 | (EP) . |
| 0318814 | 6/1989 | (EP) . |
| 0 334 993 A2 | 10/1989 | (EP) . |
| 0 348 978 A2 | 1/1990 | (EP) . |
| 0 369 436 A2 | 5/1990 | (EP) . |
| 0 193 317 B1 | 9/1990 | (EP) . |
| 0 401 540 A2 | 12/1990 | (EP) . |
| 0 460 936 A1 | 12/1991 | (EP) . |
| 0 475 064 A1 | 3/1992 | (EP) . |
| 0 497 530 A2 | 8/1992 | (EP) . |
| 0533160 | 3/1993 | (EP) . |
| 0 535 230 A1 | 4/1993 | (EP) . |
| 0 538 033 A1 | 4/1993 | (EP) . |
| 0 540 075 A1 | 5/1993 | (EP) . |
| 0 420 271 B1 | 12/1994 | (EP) . |
| 0 517 868 | 11/1995 | (EP) . |
| 0 688 794 | 12/1995 | (EP) . |
| 0 750 319 A1 | 12/1996 | (EP) . |
| 980788 | 4/1998 | (FI) . |
| 942369 | 11/1963 | (GB) . |
| 2 028 831 A | 3/1980 | (GB) . |
| 63-279503 | 11/1988 | (JP) . |
| 353509/1992 | 12/1992 | (JP) . |
| WO 91/09075 | 6/1991 | (WO) . |
| WO 92/12102 | 7/1992 | (WO) . |
| WO 92/13029 | 8/1992 | (WO) . |
| WO 95/10548 | 4/1995 | (WO) . |
| WO 97/03124 | 1/1997 | (WO) . |

OTHER PUBLICATIONS

International Search Report (revised) for PCT/SE98/01894 dated May 4, 1999.

International Search Report for PCT/SE98/01949 dated Feb. 24, 1999.

International–Type Search Report for search request No. SE98/00591 dated Jan. 29, 1999.

Mikko Saikkonin, "Extrusion of slotted core elements", Wire Technology International, Nov. 1995.

Williams et al., Polymer Letters, vol. 6, pp 621–624 (1968).*

International Search Report for PCT/SE98/01786 dated Feb. 2, 1999.

International Search Report for PCT/SE98/01894 dated Feb. 2, 1999.

* cited by examiner

CABLE AND METHOD FOR USING A CABLE-SHEATHING COMPOSITION INCLUDING AN ETHYLENE POLYMER MIXTURE The present invention relates to a cable-sheathing composition, as well as the use thereof as outer sheathing for a power cable or a communication cable.

Cables, by which is meant power cables for high voltage, medium voltage or low voltage, and communication cables, such as optical cables, coaxial cables and pair cables, generally comprise a core surrounded by a sheath consisting of one or more layers. The outermost layer is referred to as outer sheath or sheathing layer and is nowadays made of polymer material, preferably ethylene plastic. The highly diverse fields of application for various sorts of cables, such as telecommunication cables, including conventional copper cables and fibre-optical cables, as well as power cables, entail that the sheathing material has to meet a number of property requirements which in some respects are contradictory. Thus, important properties of cable-sheathing materials are good processability, i.e. it should be easy to process the material within a broad temperature range, low shrinkage, high mechanical strength, high surface finish as well as high environmental stress cracking resistance (ESCR). Since it has hitherto been difficult or even impossible to meet all these property requirements, prior-art sheathing materials have been the result of compromise, such that that good properties in one respect have been obtained at the cost of poorer properties in some other respect.

Thus, it would be highly advantageous if this compromise as regards the properties of cable-sheathing materials could be reduced or even eliminated. In particular, it would be advantageous if one were able to improve the ESCR of the material and reduce the shrinkage at a given processability.

The present invention achieves this goal by a cable-sheathing composition which, instead of the unimodal polyethylene plastic used in conventional cable-sheathing compositions, consists of a multimodal olefin polymer mixture having certain given values of density and melt flow rate, both as regards the polymer mixture and as regards the polymers forming part thereof.

The present invention thus provides a cable-sheathing composition, which is characterised in that it consists of a multimodal olefin polymer mixture having a density of about 0.915–0.955 g/cm$^3$ and a melt flow rate of about 0.1–0.3 g/10 min, said olefin polymer mixture comprising at least a first and a second olefin polymer, of which the first has a density and a melt flow rate selected from (a) about 0.930–0.975 g/cm$^3$ and about 50–2000 g/10 min and (b) about 0.88–0.93 g/cm$^3$ and about 0.1–0.8 g/10 min.

The invention further concerns the use of this cable-sheathing composition as outer sheath for a power cable or a communication cable.

Further distinctive features and advantages of the invention will appear from the following description and the appended claims.

However, before the invention is described in more detail, a few key expressions will be defined.

By the "modality" of a polymer is meant the structure of the molecular-weight distribution of the polymer, i.e. the appearance of the curve indicating the number of molecules as a function of the molecular weight. If the curve exhibits one maximum, the polymer is referred to as "unimodal", whereas if the curve exhibits a very broad maximum or two or more maxima and the polymer consists of two or more fractions, the polymer is referred to as "bimodal", "multimodal" etc. In the following, all polymers whose molecular-weight-distribution curve is very broad or has more than one maximum are jointly referred to as "multimodal".

The "melt flow rate" (MRF) of a polymer is determined in accordance with ISO 1133, condition 4, at a temperature of 190° C. and a nominal load of 2,160 kg and is equivalent to the term "melt index" previously used. The melt flow rate, which is indicated in g/10 min, is an indication of the flowability, and hence the processability, of the polymer. The higher the melt flow rate, the lower the viscosity of the polymer.

By the term "environmental stress cracking resistance" (ESCR) is meant the resistance of the polymer to crack formation under the action of mechanical stress and a reagent in the form of a surfactant. The ESCR is determined in accordance with ASTM D 1693 A, the reagent employed being Igepal CO-630.

By the term "ethylene plastic" is meant a plastic based on polyethylene or on copolymers of ethylene, the ethylene monomer making up most of the mass.

As indicated in the foregoing, the cable-sheathing composition according to the invention is distinguished by the fact that it consists of a multimodal olefin polymer mixture of specified density and melt flow rate.

It is previously known to produce multimodal, in particular bimodal, olefin polymers, preferably multimodal ethylene plastics, in two or more reactors connected in series. As instances of this prior art, mention may be made of EP 040 992, EP 041 796, EP 022 376 and WO 92/12182, which are hereby incorporated by way of reference as regards the production of multimodal polymers. According to these references, each and every one of the polymerisation stages can be carried out in liquid phase, slurry or gas phase.

According to the present invention, the main polymerisation stages are preferably carried out as a combination of slurry polymerisation/gas-phase polymerisation or gas-phase polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor or gas-phase reactor/gas-phase reactor. It is especially preferred that the composition is produced in two main polymerisation stages, in which case the first stage is performed as slurry polymerisation in a loop reactor and the second stage is performed as gas-phase polymerisation in a gas-phase reactor. Optionally, the main polymerisation stages may be preceded by a prepolymerisation, in which case up to 20% by weight, preferably 1–10% by weight, of the total amount of polymers is produced. Generally, this technique results in a multimodal polymer mixture through polymerisation with the aid of a chromium, metallocene or Ziegler-Natta catalyst in several successive polymerisation reactors. In the production of, say, a bimodal ethylene plastic, which according to the invention is the preferred polymer, a first ethylene polymer is produced in a first reactor under certain conditions with respect to monomer composition, hydrogen-gas pressure, temperature, pressure, and so forth. After the polymerisation in the first reactor, the reaction mixture including the polymer produced is fed to a second reactor, where further polymerisation takes place under other conditions. Usually, a first polymer of high melt flow rate (low molecular weight) and with a moderate or small addition of comonomer, or no such addition at all, is produced in the first reactor, whereas a second polymer of low melt flow rate (high molecular weight) and with a greater addition of comonomer is produced in the second reactor. As comonomer, use is commonly made of other olefins having up to 12 carbon atoms, such as α-olefins having 3–12 carbon atoms, e.g. propene, butene, 4-methyl-1-pentene, hexene, octene, decene, etc., in the copolymerisation of ethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, polymers, preferably ethylene polymers, and the production thereof belong to the prior art, no detailed description is called for here, but reference is had to the above specifications.

It should here be pointed out that, in the production of two or more polymer components in a corresponding number of reactors connected in series, it is only in the case of the component produced in the first reactor stage and in the case of the end product that the melt flow rate, the density and the other properties can be measured directly on the material removed. The corresponding properties of the polymer components produced in reactor stages following the first stage can only be indirectly determined on the basis of the corresponding values of the materials introduced into and discharged from the respective reactor stages.

Even though multimodal polymers and their production are known per se, it is not, however, previously known to use such multimodal polymer mixtures in cable-sheathing compositions. Above all, it is not previously known to use in this context multimodal polymer mixtures having the specific values of density and melt flow rate as are required in the present invention.

As hinted at above, it is preferred that the multimodal olefin polymer mixture in the cable-sheathing composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor, a gas-phase reactor/a gas-phase reactor or a loop reactor/a loop reactor as the polymerisation of one, two or more olefin monomers, the different polymerisation stages having varying comonomer contents. Preferably, the polymerisation conditions in the preferred two-stage method are so chosen that a comparatively low-molecular polymer having a moderate, low or, which is preferred, no content of comonomer is produced in one stage, preferably the first stage, owing to a high content of chain-transfer agent (hydrogen gas), whereas a high-molecular polymer having a higher content of comonomer is produced in another stage, preferably the second stage. The order of these stages may, however, be reversed.

Preferably, the multimodal olefin polymer mixture in accordance with the invention is a mixture of propylene plastics or, which is most preferred, ethylene plastics. The comonomer or comonomers in the present invention are chosen from the group consisting of α-olefins having up to 12 carbon atoms, which in the case of ethylene plastic means that the comonomer or comonomers are chosen from α-olefins having 3–12 carbon atoms. Especially preferred comonomers are butene, 4-methyl-1-pentene, 1-hexene and 1-octene.

In view of the above, a preferred ethylene-plastic mixture according to the invention consists of a low-molecular ethylene homopolymer mixed with a high-molecular copolymer of ethylene and butene, 4-methyl-1-pentene, 1-hexene or 1-octene.

The properties of the individual polymers in the olefin polymer mixture according to the invention should be so chosen that the final olefin polymer mixture has a density of about 0.915–0.955 g/cm$^3$, preferably about 0.920–0.950 g/cm$^3$, and a melt flow rate of about 0.1–3.0 g/10 min, preferably about 0.2–2.0 g/10 min. According to the invention, this is preferably achieved by the olefin polymer mixture comprising a first olefin polymer having a density of about 0.930–0.975 g/cm$^3$, preferably about 0.955–0.975 g/cm$^3$, and a melt flow rate of about 50–2000 g/10 min, preferably about 100–1000 g/10 min, and most preferred about 200–600 g/10 min, and at least a second olefin polymer having such a density and such a melt flow rate that the olefin polymer mixture obtains the density and the melt flow rate indicated above.

If the multimodal olefin polymer mixture is bimodal, i.e. is a mixture of two olefin polymers (a first olefin polymer and a second olefin polymer), the first olefin polymer being produced in the first reactor and having the density and the melt flow rate indicated above, the density and the melt flow rate of the second olefin polymer, which is produced in the second reactor stage, may, as indicated in the foregoing, be indirectly determined on the basis of the values of the materials supplied to and discharged from the second reactor stage.

In the event that the olefin polymer mixture and the first olefin polymer have the above values of density and melt flow rate, a calculation indicates that the second olefin polymer produced in the second stage should have a density in the order of about 0.88–0.93 g/cm$^3$, preferably 0.91–0.93 g/cm$^3$, and a melt flow rate in the order of about 0.01–0.8 g/10 min, preferably about 0.05–0.3 g/10 min.

As indicated in the foregoing, the order of the stages may be reversed, which would mean that, if the final olefin polymer mixture has a density of about 0.915–0.955 g/cm$^3$, preferably about 0.920–0.950 g/cm$^3$, and a melt flow rate of about 0.1–3.0 g/10 min, preferably about 0.2–2.0 g/10 min, and the first olefin polymer produced in the first stage has a density of about 0.88–0.93 g/cm$^3$, preferably about 0.91–0.93 g/cm$^3$, and a melt flow rate of 0.01–0.8 g/10 min, preferably about 0.05–0.3 g/10 min, then the second olefin polymer produced in the second stage of a two-stage method should, according to calculations as above, have a density in the order of about 0.93–0.975 g/cm$^3$, preferably about 0.955–0.975 g/cm$^3$, and a melt flow rate of 50–2000 g/10 min, preferably about 100–1000 g/10 min, and most preferred about 200–600 g/10 min. This order of the stages in the production of the olefin polymer mixture according to the invention is, however, less preferred.

In order to optimise the properties of the cable-sheathing composition according to the invention, the individual polymers in the olefin polymer mixture should be present in such a weight ratio that the aimed-at properties contributed by the individual polymers are also achieved in the final olefin polymer mixture. As a result, the individual polymers should not be present in such small amounts, such as about 10% by weight or below, that they do not affect the properties of the olefin polymer mixture. To be more specific, it is preferred that the amount of olefin polymer having a high melt flow rate (low-molecular weight) makes up at least 25% by weight but no more than 75% by weight of the total polymer, preferably 35–55% by weight of the total polymer, thereby to optimise the properties of the end product.

The use of multimodal olefin polymer mixtures of the type described above results in inventive cable-sheathing compositions having much better properties than conventional cable-sheathing compositions, especially as regards shrinkage, ESCR and processability. In particular the reduced shrinkage of the inventive cable-sheathing composition is a great advantage.

As indicated in the foregoing, the cable-sheathing composition according to the invention can be used for producing outer sheaths for cables, including power cables as well as communication cables. Amongst power cables, whose outer sheaths may advantageously be produced from the cable-sheathing composition according to the invention, mention may be made of high-voltage cables, medium-voltage cables and low-voltage cables. Amongst communication cables, whose outer sheaths may advantageously be made from the cable-sheathing composition according to the invention, mention may be made of pair cables, coaxial cables and optical cables.

Here follows a few non-restricting Examples intended to further elucidate the invention and its advantages.

EXAMPLE 1

In a polymerisation plant consisting of a loop reactor connected in series to a gas-phase reactor and involving the utilisation of a Ziegler-Natta catalyst, a bimodal ethylene plastic was polymerised under the following conditions.

The First Reactor (Loop Reactor)

In this reactor, a first polymer (Polymer 1) was produced by the polymerisation of ethylene in the presence of hydrogen (molar ratio of hydrogen to ethylene=0.38:1). The resulting ethylene homopolymer had an MFR value of 492 g/10 min and a density of 0.975 g/cm$^3$.

The Second Reactor (Gas-Phase Reactor)

In this reactor, a second polymer (Polymer 2) was produced by the polymerisation of ethylene and butene (molar ratio in the gas phase of butene to ethylene=0.22:1, of hydrogen to ethylene=0.03:1). The resulting copolymer of ethylene and butene was present in the form of an intimate mixture with the ethylene homopolymer from the first reactor, the weight ratio of Polymer 1 to Polymer 2 being 45:55.

The bimodal mixture of Polymer 1 and Polymer 2 had a density of 0.941 g/cm$^3$ and an MFR value of 0.4 g/10 min. After compounding with carbon black, one obtained an end product containing 2.5% by weight thereof, resulting in a final density of 0.951 g/cm$^3$. This end product will in the following be referred to as Bimodal Ethylene Plastic 1.

Bimodal Ethylene Plastic 1 was used as cable-sheathing composition, and the properties of this composition were determined and compared with those of a conventional cable-sheathing composition of unimodal ethylene plastic (Reference 1). Reference 1 had a density of 0.941 g/cm$^3$ (after compounding to a carbon-black content of 2.5% by weight and a density of 0.951 g/cm$^3$) and an MFR value of 0.24 g/10 min.

In this Example, as well as the following Examples, the shrinkage of the composition produced was determined in accordance with a method (in the following referred to as UNI-5079) which had been developed in order to evaluate the shrinkage tendency of sheathing materials. The shrinkage is determined in the following manner.

Cable samples for the evaluation are extruded as follows.

| | |
|---|---|
| Conductor: | 3.0 mm solid, Al conductor |
| Wall thickness: | 1.0 mm |
| Temperature, die: | +210° C. or +180° C. |
| Distance between die and water bath: | 35 cm |
| Temperature, water bath: | +23° C. |
| Line velocity: | 75 m/min |
| Die type: | Semi-tube |
| Nipple: | 3.65 mm |
| Die: | 5.9 mm |
| Screw design: | Elise |
| Breaking plate | |

The shrinkage in per cent is measured after 24 h in a room with constant temperature (+23° C.) as well as after 24 h at a temperature of +100° C.

Cable samples measuring approximately 40 cm are measured. Conveniently, the cable sample is so marked that measurement after the conditionings can be carried out at the same point on the cable sample.

Should the sample be found to shrink during measurement, marks of about 40 cm first have to be made. Then, the length is cut and remeasured. Double samples are taken of each cable that is to be analysed. The samples are placed in the room with constant temperature for 24 h, whereupon they are measured, and the shrinkage value in percent is calculated.

All the samples are then placed on a talcum bed at +100° C. for 24 h. The samples are then measured, and the total shrinkage value in percent is calculated on the basis of the initial length.

The measurement results are indicated in Table 1 below.

TABLE 1

| Material properties | Bimodal 1 | Reference 1 |
|---|---|---|
| Tensile break strength (MPa)[1] | 34 | 38 |
| Elongation at break (%)[1] | 800 | 900 |
| ESCR[2] | 0/2000 h | F20/550 h |
| Shrinkage (%) at | | |
| 23° C./24 h[3] | 0.0 | 0.7 |
| 23° C./24 h[4] | 0.0 | 0.7 |
| Shrinkage (%) at | | |
| 100° C./24 h[3] | 1.0 | 2.0 |
| 100° C./24 h[4] | 0.9 | 2.3 |
| Surface finish[5] | | |
| After extrusion at 180° C. at | | |
| 15 m/min | 0–1 | 0 |
| 35 m/min | 0–1 | 0 |
| 75 m/min | 0 | 0 |
| 140 m/min | 0 | 1 |
| After extrusion at 210° C. at | | |
| 15 m/min | — | 0 |
| 35 m/min | 0–1 | 0 |
| 75 m/min | 0–1 | 0 |
| 140 m/min | 0 | 0–1 |

[1]Determined in accordance with ISO 527-2 1993/5A on cable samples.
[2]Determined in accordance with ASTM D 1693/A, 10% Igepal. The results are indicated as the percentage of cracked sample rods at a given time. F20 means that 20% of the sample rods were cracked after the time indicated.

TABLE 1-continued

| Material properties | Bimodal 1 | Reference 1 |
|---|---|---|

[3] Determined in accordance with UNI-5079 after extrusion at 180° C.
[4] Determined in accordance with UNI-5079 after extrusion at 210° C.
[5] Classification: 0 = excellent to 4 = very uneven.

It is evident from the values indicated in Table 1 that the inventive sheathing material exhibits improved properties as regards shrinkage, especially at room temperature, and environmental stress cracking resistance (ESCR). The tensile-strength properties of the sheathing material according to the invention are on a level with those of Reference 1. Also the processability, which can be deduced from the MFR value, of the sheathing material according to the invention is as good as that of Reference 1. It should be emphasised that, whereas the sheathing material of Reference 1 has good processing properties obtained at the cost of poor shrinkage properties, especially at room temperature, the sheathing material according to the invention has good processing properties as well as good (low) shrinkage properties. This is a considerable advantage, which is enhanced by the improved ESCR properties of the sheathing material according to the invention.

EXAMPLE 2

In the polymerisation plant of Example 1, a bimodal ethylene plastic was produced under the following conditions.

The First Reactor (Loop Reactor)

In this reactor, a first polymer (Polymer 1) was produced by the polymerisation of ethylene in the presence of hydrogen (molar ratio of hydrogen to ethylene=0.38:1). The resulting ethylene homopolymer had an MFR value of 444 g/10 min and a density of 0.975 g/cm$^3$.

The Second Reactor (Gas-Phase Reactor)

In this reactor, a second polymer (Polymer 2) was produced by the polymerisation of ethylene and butene (molar ratio of butene to ethylene=0.23:1; molar ratio of hydrogen to ethylene=0.09:1). The resulting copolymer of ethylene and butene was present in the form of an intimate mixture with the ethylene homopolymer from the first reactor, the weight ratio of Polymer 1 to Polymer 2 being 40:60.

The bimodal mixture of Polymer 1 and Polymer 2, which constituted the end product, had a density of 0.941 g/cm$^3$ (after an addition of 2.5% by weight of carbon black, 0.951 g/cm$^3$) and an MFR value of 1.4 g/10 min. In the following, this end product will be referred to as Bimodal Ethylene Plastic 2.

In similar fashion, yet another bimodal ethylene plastic was produced (in the following referred to as Bimodal Ethylene Plastic 3), the molar ratio of hydrogen to ethylene in the first reactor being 0.39:1, and the resulting ethylene homopolymer (Polymer 1) in the first reactor having an MFR value of 468 g/10 min and a density of 0.962 g/cm$^3$. In the second reactor, a copolymer of ethylene and butene (Polymer 2) was produced, the molar ratio of butene to ethylene being 0.24:1, and the molar ratio of hydrogen to ethylene being 0.07:1. The weight ratio of Polymer 1 to Polymer 2 was 45:55. The end product (Bimodal Ethylene Plastic 3) had a density of 0.941 g/cm$^3$ (after compounding with 2.5% by weight of carbon black, 0.951 g/cm$^3$) and an MFR value of 1.3 g/10 min.

Bimodal Ethylene Plastic 2 and Bimodal Ethylene Plastic 3 were used as cable-sheathing compositions, and the properties of these compositions were determined and compared with those of a prior-art sheathing composition (Reference 2). Reference 2 was a special composition intended for use in cases where particularly low shrinkage is required, such as fibre-optical applications, and this composition consisted of a melt blend of a polyethylene fraction having a density of 0.960 g/cm$^3$ and an MFR value of 3.0 g/10 min, and another polyethylene fraction having a density of 0.920 g/cm$^3$ and an MFR value of 1.0 g/10 min. This resulted in an end product having a density of 0.943 g/cm$^3$ (after an addition of 2.5% by weight of carbon black, 0.953 g/cm$^3$) and an MFR value of 1.7 g/10 min.

The results of the measurements of the properties of the three cable-sheathing compositions are indicated in Table 2 below.

TABLE 2

| Material properties | Bimodal ethylene plastic | | |
|---|---|---|---|
| | 2 | 3 | Reference 2 |
| Tensile break strength (MPa)[1] | 32 | 30 | 32 |
| Elongation at break (%)[1] | 900 | 890 | 1150 |
| ESCR[2] | 0/2000 h | 0/2000 h | F20/190 h |
| Shrinkage (%) at 23° C./24 h[4] | 0.0 | 0.0 | 0.1 |
| Shrinkage (%) at 100° C./24 h[4] | 0.8 | 1.0 | 0.8 |
| Surface finish[5] After extrusion at 210° C. at | | | |
| 15 m/min | 2 | 2 | 3 |
| 35 m/min | 1–2 | 1 | 4 |
| 75 m/min | 0–1 | 0 | 4 |
| 140 m/min | 0–1 | 0 | 4 |

[1] Determined in accordance with ISO 527-2 1993/5A.
[2] Determined in accordance with ASTM D 1693/A, 10% Igepal. The results are indicated as the percentage of cracked sample rods at a given time. F20 means that 20% of the sample rods were cracked after the given time.
[4] Determined in accordance with UNI-5079 after extrusion at 210° C.
[5] Classification: 0 = excellent to 4 = very uneven.

As is evident from Table 2, the prior-art special sheathing material (Reference 2) has good shrinkage properties at room temperature. However, the shrinkage properties of Reference 2 have been achieved at the cost of poor processing properties, as appears from, inter alia, the poor values of surface finish. Generally, the sheathing material of Reference 2 can only be processed within a narrow "process window", i.e. within narrow ranges as regards the processing parameters. In contrast to Reference 2, the sheathing materials according to the invention (Bimodal Ethylene Plastic 2 and 3) exhibit as good shrinkage properties as Reference 2 while presenting better processing properties (broader process window) involving a better surface finish of the cable sheath. Furthermore, the sheathing materials according to the invention exhibit much better environmental stress cracking resistance (ESCR) and also present good tensile break strength.

EXAMPLE 3

In the polymerisation plant used in Examples 1 and 2, a bimodal polyethylene plastic (Ethylene Plastic 4) was produced under the following conditions.

The First Reactor (Loop Reactor)

In this reactor, a first polymer (Polymer 1) was produced by the polymerisation of ethylene in the presence of 1-butene and hydrogen gas (molar ratio 1-butene:hydrogen gas:ethylene=1.74:0.22:1). Polymer 1 had an MFR value of 310 g/10 min and a density of 0.939 g/cm$^3$.

The Second Reactor (Gas-Phase Reactor)

The polymer from the loop reactor was transferred to the gas-phase reactor, where further polymerisation of ethylene with 1-butene in the presence of hydrogen gas was carried out (molar ratio 1-butene:hydrogen gas:ethylene= 0.80:0.02:1), resulting in a new polymer component (Polymer 2). The weight ratio of Polymer 1 to Polymer 2 was 42:58. The MFR value of the resulting end product was 0.3 g/10 min, and the density was 0.922 g/cm$^3$.

Excellent mechanical properties, good ESCR as well as good shrinkage properties were achieved also in this case, where both polymer components contain 1-butene as comonomer, as is evident from Table 3 below.

TABLE 3

| Material properties | Ethylene plastic 4 |
|---|---|
| Tensile break strength | 25.9 MPa |
| Elongation at break | 905% |
| ESCR | 0/2000 h |
| Shrinkage % 23° C./24 h | 0% |
| 100° C./24 h | 0% |

What is claimed is:

1. A method for using a cable-sheathing composition comprising:

applying a cable-sheathing composition as an outer sheath for a power cable, wherein the cable-sheathing composition comprises a multimodal molecular weight distribution ethylene polymer mixture obtained by polymerization of ethylene in more than one stage, the ethylene polymer mixture having a density of about 0.915–0.955 g/cm$^3$ and a melt flow rate of about 0.1–3.0 g/10 min, said ethylene polymer mixture comprising at least a first and a second ethylene polymer, of which the first has a density and a melt flow rate selected from the group consisting of: (a) about 0.955–0.975 g/cm$^3$ and about 100–1000 g/10 min and (b) about 0.88–0.93 g/cm$^3$ and about 0.01–0.8 g/10 min., wherein the multimodal molecular weight distribution ethylene polymer mixture after extrusion as a cable-sheathing at 180° C. or 210° C. a shrinkage according to UNI-5079 of 1% or less when held at 23° C. for 24 hours and a shrinkage of 1% or less when held at 100° C. for 24 hours.

2. A method for using a cable-sheathing composition comprising:

applying a cable-sheathing composition as an outer sheath for a communication cable, wherein the cable-sheathing composition comprises a multimodal molecular weight distribution ethylene polymer mixture obtained by polymerization of ethylene in more than one stage, the ethylene polymer mixture having a density of about 0.915–0.955 g/cm$^3$ and a melt flow rate of about 0.1–3.0 g/10 min, said ethylene polymer mixture comprising at least a first and a second ethylene polymer, of which the first has a density and a melt flow rate selected from the group consisting of: (a) about 0.955–0.975 g/cm$^3$ and about 100–1000 g/10 min and (b) about 0.88–0.93 g/cm$^3$ and about 0.01–0.8 g/10 min., wherein the multimodal molecular weight distribution ethylene polymer mixture after extrusion as a cable-sheathing at 180° C. or 210° C. a shrinkage according to UNI-5079 of 1% or less when held at 23° C. for 24 hours and a shrinkage of 1% or less when held at 100° C. for 24 hours.

3. A method for using a cable-sheathing composition comprising:

applying a cable-sheathing composition as an outer sheath for a fibre-optical cable, wherein the cable-sheathing composition comprises a multimodal molecular weight distribution ethylene polymer mixture obtained by polymerization of ethylene in more than one stage, the ethylene polymer mixture having a density of about 0.915–0.955 g/cm$^3$ and a melt flow rate of about 0.1–3.0 g/10 min, said ethylene polymer mixture comprising at least a first and a second ethylene polymer, of which the first has a density and a melt flow rate selected from the group consisting of: (a) about 0.955–0.975 g/cm$^3$ and about 100–1000 g/10 min and (b) about 0.88–0.93 g/cm$^3$ and about 0.01–0.8 g/10 min., wherein the multimodal molecular weight distribution ethylene polymer mixture after extrusion as a cable-sheathing at 180° C. or 210° C. a shrinkage according to UNI-5079 of 1% or less when held at 23° C. for 24 hours and a shrinkage of 1% or less when held at 100° C. for 24 hours.

4. A cable comprising an outer sheath, the outer sheath comprising a multimodal molecular weight distribution ethylene polymer mixture obtained by polymerization of ethylene in more than one stage, the ethylene polymer mixture having a density of about 0.915–0.955 g/cm$^3$ and a melt flow rate of about 0.1–3.0 g/10 min, the ethylene polymer mixture comprising at least a first ethylene polymer and a second ethylene polymer, the first ethylene polymer has a density and a melt flow rate selected from the group consisting of: (a) about 0.955–0.975 g/cm$^3$ and about 100–1000 g/10 min and (b) about 0.88–0.93 g/cm$^3$ and about 0.01–0.8 g/10 min, wherein the multimodal molecular weight distribution ethylene polymer mixture after extrusion as a cable-sheathing at 180° C. or 210° C. a shrinkage according to UNI-5079 of 1% or less when held at 23° C. for 24 hours and a shrinkage of 1% or less when held at 100° C. for 24 hours.

5. A cable according to claim 4, wherein the olefin polymer mixture has a density of about 0.920–0.950 g/cm$^3$ and a melt flow rate of about 0.2–2.0 g/10 min.

6. A cable according to claim 4, wherein the ethylene polymer mixture has been obtained by coordination-catalyzed polymerization in at least two stages of ethylene and, in at least one of the stages, an α-olefin comonomer having 3–12 carbon atoms.

7. A cable according to claim 4, wherein the polymerization stages have been carried out as slurry polymerization, gas-phase polymerization or a combination thereof.

8. A cable according to claim 7, wherein the slurry polymerization has been carried out in a loop reactor.

9. A cable according to claim 8, wherein the polymerization has been carried out in a loop-reactor/gas-phase-reactor process in at least one loop reactor followed by at least one gas-phase reactor.

10. A cable according to claim 4, wherein the multimodal molecular weight distribution ethylene polymer mixture is a bimodal molecular weight distribution ethylene polymer mixture.

11. A cable according to claim 10, wherein the first ethylene polymer makes up 25–75% by weight of the total amount of polymers in the composition.

12. A cable according to claim 11, wherein the first ethylene polymer is an ethylene homopolymer and the second ethylene polymer is an ethylene copolymer.

13. A cable according to claim 4, wherein the outer sheath composition has an Environmental Stress Cracking Resistance (ESCR) of 0% cracked sample rods after 2000 h (0/2000), determined in accordance with ASTM D 1693/A, 10% Igepal.

14. A cable according to claim 4, wherein the ethylene polymer mixture is obtained by polymerization of ethylene and α-olefin.

15. A cable comprising an outer sheath, the outer sheath comprising a multimodal molecular weight distribution ethylene polymer mixture obtained by polymerization of ethylene in more than one stage, the ethylene polymer mixture having a density of about 0.915–0.955 g/cm$^3$ and a melt flow rate of about 0.1–3.0 g/10 min, the ethylene polymer mixture comprising at least a first ethylene polymer and a second ethylene polymer, the first ethylene polymer has a density and a melt flow rate selected from the group consisting of: (a) about 0.955–0.975 g/cm$^3$ and about 100–1000 g/10 min and (b) about 0.88–0.93 g/cm$^3$ and about 0.01–0.8 g/10 min, wherein the multimodal molecular weight distribution ethylene polymer mixture after extrusion as a cable-sheathing at 180° C. or 210° C. a shrinkage according to UNI-5079 of 1% or less when held at 23° C. for 24 hours and a shrinkage of 1% or less when held at 100° C. for 24 hours.

16. A cable according to claim 15, wherein the olefin polymer mixture is obtained by polymerization of ethylene and α-olefin.

17. A cable according to claim 15, wherein the cable comprises a fibre-optical cable.

18. A cable according to claim 15, wherein the olefin polymer mixture has a density of about 0.920–0.950 g/cm$^3$ and a melt flow rate of about 0.2–2.0 g/10 min.

19. A cable according to claim 15, wherein the ethylene polymer mixture has been obtained by coordination-catalyzed polymerization in at least two stages of ethylene and, in at least one of the stages, an α-olefin comonomer having 3–12 carbon atoms.

20. A cable according to claim 15, wherein the polymerization stages have been carried out as slurry polymerization, gas-phase polymerization, or a combination thereof.

21. A cable according to claim 20, wherein the slurry polymerization has been carried out in a loop reactor.

22. A cable according to claim 21, wherein the polymerization has been carried out in a loop-reactor/gas-phase-reactor process in at least one loop reactor followed by at least one gas-phase reactor.

23. A cable according to claim 15, wherein the multimodal molecular weight distribution ethylene polymer mixture is a bimodal molecular weight distribution ethylene polymer mixture.

24. A cable according to claim 23, wherein the first ethylene polymer makes up 25–75% by weight of the total amount of polymers in the composition.

25. A cable according to claim 24, wherein the first ethylene polymer is an ethylene homopolymer and the second ethylene polymer is an ethylene copolymer.

26. A cable according to claim 15, wherein the outer sheath composition has an Environmental Stress Cracking Resistance (ESCR) of 0% cracked sample rods after 2000 h (0/2000), determined in accordance with ASTM D 1693/A, 10% Igepal.

* * * * *